(12) United States Patent
Nishiyama et al.

(10) Patent No.: US 8,896,178 B2
(45) Date of Patent: Nov. 25, 2014

(54) SYNCHRONOUS ELECTRIC MOTOR DRIVE SYSTEM HAVING SLIT WINDINGS

(75) Inventors: Noriyoshi Nishiyama, Osaka (JP); Makoto Kitabatake, Nara (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 13/386,966

(22) PCT Filed: Feb. 15, 2011

(86) PCT No.: PCT/JP2011/000829
§ 371 (c)(1),
(2), (4) Date: Jan. 25, 2012

(87) PCT Pub. No.: WO2011/102114
PCT Pub. Date: Aug. 25, 2011

(65) Prior Publication Data
US 2012/0119690 A1  May 17, 2012

(30) Foreign Application Priority Data

Feb. 16, 2010  (JP) ................................ 2010-030847

(51) Int. Cl.
| | | |
|---|---|---|
| *H02K 3/28* | (2006.01) | |
| *H02P 6/08* | (2006.01) | |
| *H02K 21/16* | (2006.01) | |
| *H02K 3/16* | (2006.01) | |
| *H02K 3/20* | (2006.01) | |
| *H02K 29/12* | (2006.01) | |
| *H02K 1/14* | (2006.01) | |
| *H02K 21/22* | (2006.01) | |
| *H02P 6/10* | (2006.01) | |
| *H02P 25/18* | (2006.01) | |

(52) U.S. Cl.
CPC .................. *H02K 1/146* (2013.01); *H02K 3/28* (2013.01); *H02K 21/16* (2013.01); *H02K 21/222* (2013.01); *H02P 6/10* (2013.01); *H02P 25/18* (2013.01); *H02K 3/20* (2013.01)
USPC .......... 310/198; 310/68 B; 310/172; 310/183; 310/210; 310/216.064

(58) Field of Classification Search
CPC ............ H02K 1/146; H02K 3/20; H02K 3/28; H02K 21/16; H02K 21/222; H02P 6/10; H02P 25/18
USPC ......... 310/68 B, 172, 183, 198, 210, 215.064
IPC ...... H02K 3/16, 3/20, 3/28, 21/16, 29/12; H02P 6/08
See application file for complete search history.

(56) References Cited

U.S. PATENT DOCUMENTS 1,960,981 A * 5/1934 Stocker .......................... 446/285
2,154,289 A * 4/1939 Shutt .............................. 310/183

(Continued)

FOREIGN PATENT DOCUMENTS

DE  19838335 A1 * 3/2000
EP   2 309 622 A1    4/2011

(Continued)

OTHER PUBLICATIONS

International Search Report issued Mar. 22, 2011 in corresponding International Application No. PCT/JP2011/000829.

*Primary Examiner* — John K Kim
(74) *Attorney, Agent, or Firm* — Wenderoth, Lind & Ponack, L.L.P.

(57) ABSTRACT

A synchronous motor drive system improves the design flexibility regarding torque characteristics as compared with conventionally available design flexibility. A synchronous motor has a rotor and a stator. Each of at least two adjacent stator teeth has a slit formed at the tip thereof. Each of a plurality of stator teeth has a main coil wound therearound in concentrated winding. Between each two adjacent teeth having a slit, a sub-coil is wound around in a manner of being accommodated in the respective slits. The drive device separately controls electric current supplied to the main coils and electric current supplied to the sub-coil.

20 Claims, 17 Drawing Sheets

(56) References Cited

U.S. PATENT DOCUMENTS

| | | | | |
|---|---|---|---|---|
| 2,530,932 A | * | 11/1950 | Atwell et al. | 310/201 |
| 2,894,157 A | * | 7/1959 | Morrill | 310/179 |
| 2,975,311 A | * | 3/1961 | Suhr | 310/172 |
| 3,045,197 A | * | 7/1962 | Vanslette | 336/135 |
| 4,210,836 A | * | 7/1980 | Kouba | 310/112 |
| 4,424,463 A | * | 1/1984 | Musil | 310/49.53 |
| 4,435,664 A | * | 3/1984 | Boesel | 310/186 |
| 4,472,670 A | * | 9/1984 | Stanley | 318/774 |
| 4,481,440 A | * | 11/1984 | Muller | 310/268 |
| 5,796,194 A | * | 8/1998 | Archer et al. | 310/68 B |
| 6,066,905 A | * | 5/2000 | Wright et al. | 310/179 |
| 6,750,575 B2 | * | 6/2004 | Wright | 310/68 B |
| 2006/0219470 A1 | | 10/2006 | Imagawa et al. | |
| 2008/0252166 A1 | * | 10/2008 | Shiga et al. | 310/156.56 |
| 2010/0181862 A1 | * | 7/2010 | Krauth et al. | 310/198 |
| 2010/0289373 A1 | | 11/2010 | Nishiyama | |
| 2011/0057591 A1 | | 3/2011 | Tagome et al. | |
| 2012/0119690 A1 | * | 5/2012 | Nishiyama et al. | 318/724 |

FOREIGN PATENT DOCUMENTS

| | | |
|---|---|---|
| JP | 61-161942 | 7/1986 |
| JP | 4-322142 | 11/1992 |
| JP | 6-90538 | 3/1994 |
| JP | 6-178510 | 6/1994 |
| JP | 8-308189 | 11/1996 |
| JP | 9-243697 | 9/1997 |
| JP | 2003-153514 | 5/2003 |
| JP | 2006-273153 | 10/2006 |
| WO | WO 2008019954 A1 * | 2/2008 |
| WO | WO 2009089935 A1 * | 7/2009 |
| WO | 2009/144957 | 12/2009 |
| WO | 2010/013433 | 2/2010 |
| WO | 2010/050172 | 5/2010 |
| WO | 2011/016235 | 2/2011 |

* cited by examiner

➡ Winding direction of main coil
⇨ Winding direction of sub-coil

A = π/9 radians

→ Winding direction of main coil
⇨ Winding direction of sub-coil

A = π/9 radians

FIG. 18 - PRIOR ART
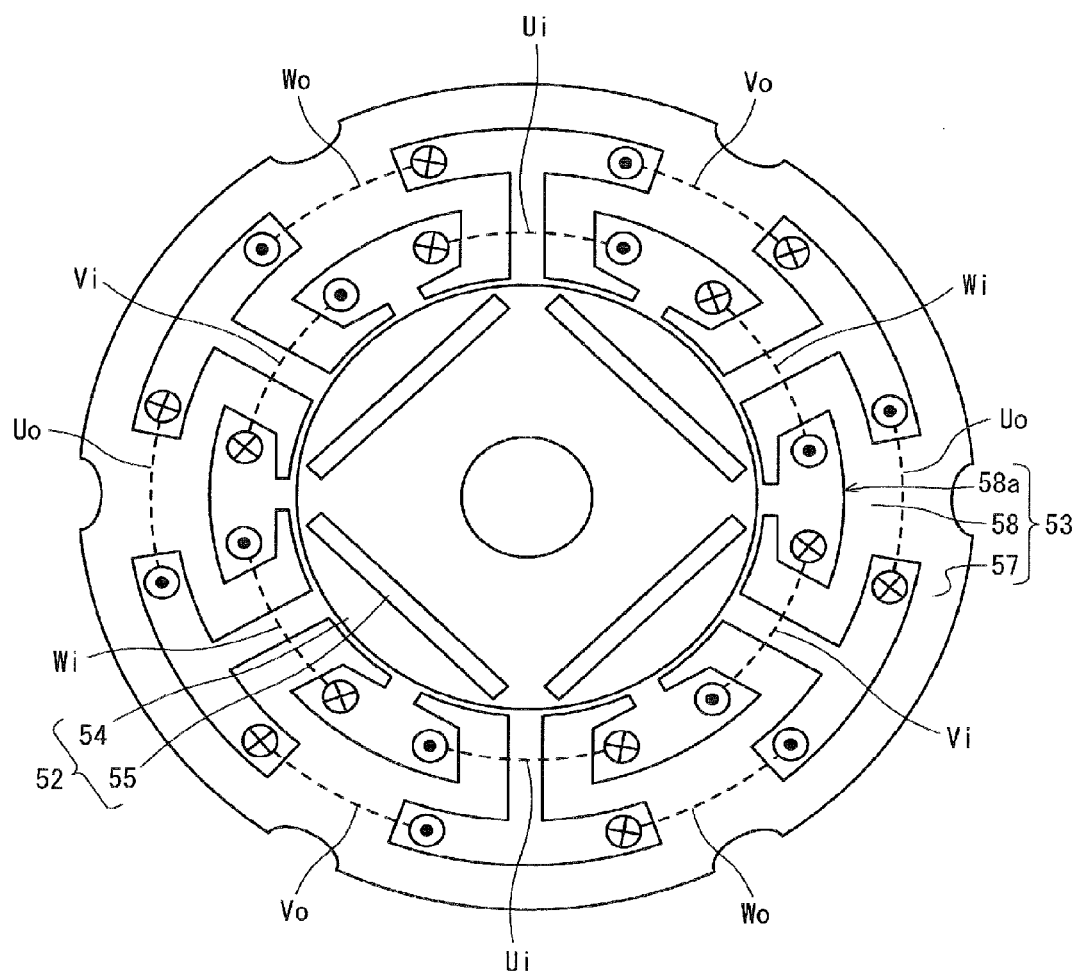

SYNCHRONOUS ELECTRIC MOTOR DRIVE SYSTEM HAVING SLIT WINDINGS

TECHNICAL FIELD

The present invention relates to synchronous motor drive systems composed of a synchronous motor and a drive device, and in particular to torque characteristics.

BACKGROUND ART

Synchronous motor drive systems composed of a synchronous motor and a drive device are incorporated in various devices, such as compressors, electric vehicles, hybrid vehicles, and fuel-cell vehicles.

FIG. 18 is a plan view of a synchronous motor described in Patent Literature 1.

The synchronous motor is composed of a rotor 52 and a stator 53. The rotor 52 includes a rotor core 54 and four permanent magnets 55. The stator 53 includes an annular stator yoke 57 and six stator teeth 58 which are arranged circumferentially on the stator yoke 57 at spaced intervals. The stator teeth 58 have outer coils Uo, Vo, and Wo and inner coils Ui, Vi, and Wi. Each coil is wound around in concentrated winding and disposed at an electrical angle of π radians with respect to a corresponding outer or inner coil. As the drive device, a three-phase inverter is disclosed. The coils Uo and Ui commonly receive U-phase electric current, the coils Vo and Vi commonly receive V-phase electric current, and the coils Wo and Wi commonly receive W-phase electric current.

CITATION LIST

Patent Literature

[Patent Literature 1]
JP patent application publication No. 2003-153514

SUMMARY OF INVENTION

Technical Problem

The range of applications of synchronous motors covers many fields. Therefore, a high degree of flexibility in torque characteristics is desired. In view of the above, the present invention aims to provide a synchronous motor drive system which gives a higher degree of design flexibility regarding the torque characteristics as compared with a conventional technology.

Solution to Problem

A synchronous motor drive system according to the present invention includes a synchronous motor and a drive device for driving the synchronous motor. The synchronous motor includes: a rotor having a plurality of magnetic poles located circumferentially of the rotor at equally spaced intervals; a stator having an annular stator yoke and a plurality of stator teeth located circumferentially on the stator yoke at equally spaced intervals, each stator tooth in one or more pairs of two adjacent stator teeth having a slit formed at a tip thereof; a plurality of main coils each wound around a different one of the stator teeth in concentrated winding; and one or more sub-coils each wound between a different pair of the one or more pairs through the slits. The drive device is configured to separately control electric current supplied to the main coils and electric current supplied to the sub-coils.

Advantageous Effects of Invention

The above structure allows the electric current flowing through the main coils and the electric current flowing through the sub-coils to be separately controlled, which provides higher design flexibility about the torque characteristics than conventionally available design flexibility.

BRIEF DESCRIPTION OF DRAWINGS

FIG. 18 is a plan view of a synchronous motor described in Patent Literature 1.

DESCRIPTION OF EMBODIMENTS

The following describes in detail embodiments of the present invention with reference to the accompanying drawings.

First Embodiment

<General Structure>

Figure 1:
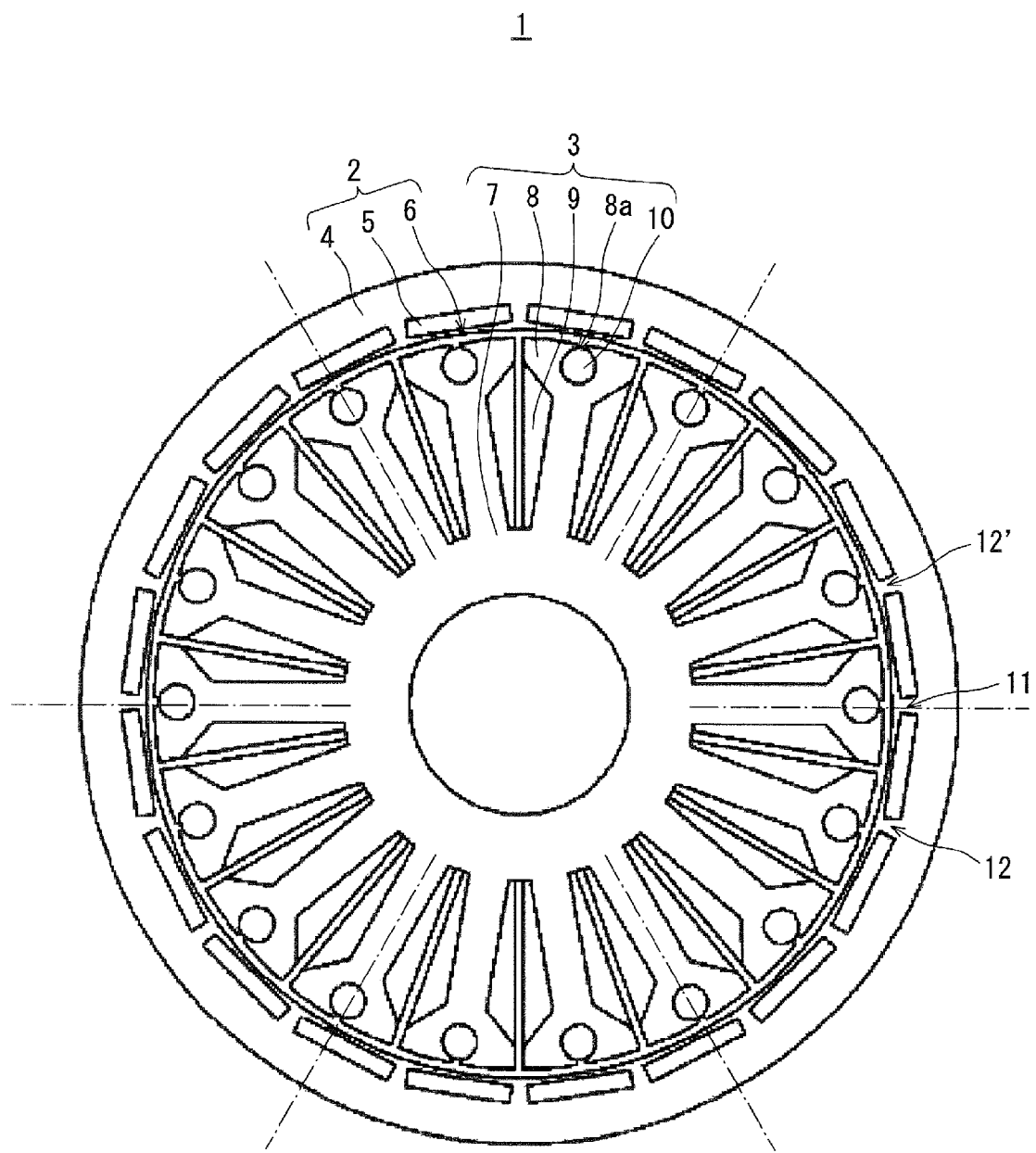
FIG. 1 is a plan view of a synchronous motor according to a first embodiment of the present invention.

FIG. 1 is a plan view of a synchronous motor according to a first embodiment of the present invention.

The synchronous motor 1 is composed of a rotor 2 and a stator 3.

The rotor 2 includes a rotor core 4 and also includes 20 permanent magnets 5. The permanent magnets 5 are arranged on the rotor core 4 at equally spaced intervals along the circumferential direction of the rotor. The permanent magnets 5 have magnetic poles 6 which are located so that pairs each composed of alternating North magnetic pole and South magnetic pole face the stator 3. Each pair of North magnetic pole and South magnetic pole forms an electrical angle of $2\pi$ radians, and the interval between adjacent magnetic poles is an electrical angle of $\pi$ radians. In the present embodiment, the rotor has 20 magnetic poles. Thus, the electrical angle is 10 times the mechanical angle.

The stator 3 includes an annular stator yoke 7 and also includes 18 stator teeth 8 which are arranged circumferentially on the stator yoke 7 at spaced intervals. More specifically, the stator teeth 8 are arranged on the stator 7 at equally spaced intervals along the circumferential direction. As described above, the number of magnetic poles is 20, while the number of stator teeth is 18. That is, the stator teeth 8 are arranged circumferentially offset by a factor of 10/9 per semi-circle. The interval between adjacent stator teeth 8 is the electrical angle of $(\pi+\pi/9)$ radians.

On each stator tooth 8, one main coil 9 is wound in concentrated winding. In addition, each stator tooth has a slit 8a at the tip thereof. Between each two adjacent stator teeth, one sub-coil 10 is wound around through the respective slits. The main coils 9 and the sub-coils 10 are described later in detail.

Rotor inter-polar gaps 11 and 12 each refer to the position of magnetic neutral point between North magnetic pole and South magnetic pole of the permanent magnets 5 arranged on the rotor 2. Such positions are also mechanically located between any two adjacent magnets. Note that the inter-polar gap 11 refers to a magnetic neutral point from North magnetic pole to South magnetic pole in the counterclockwise direction, and the inter-polar gap 12 refers to a magnetic neutral point from South magnetic pole to North magnetic pole in the counterclockwise direction. It should be noted that 12' denotes an inter-polar gap that is at an electrical angle of $2\pi$ radians from the inter-polar gap 12. Due to repetition of a pair of magnetic poles, each inter-polar gap 12' is at the same position in terms of electrical angle but a different position in terms of mechanical angle.

<Positional Relation of Stator Teeth and Structure of Stator Coils>

Figure 2:
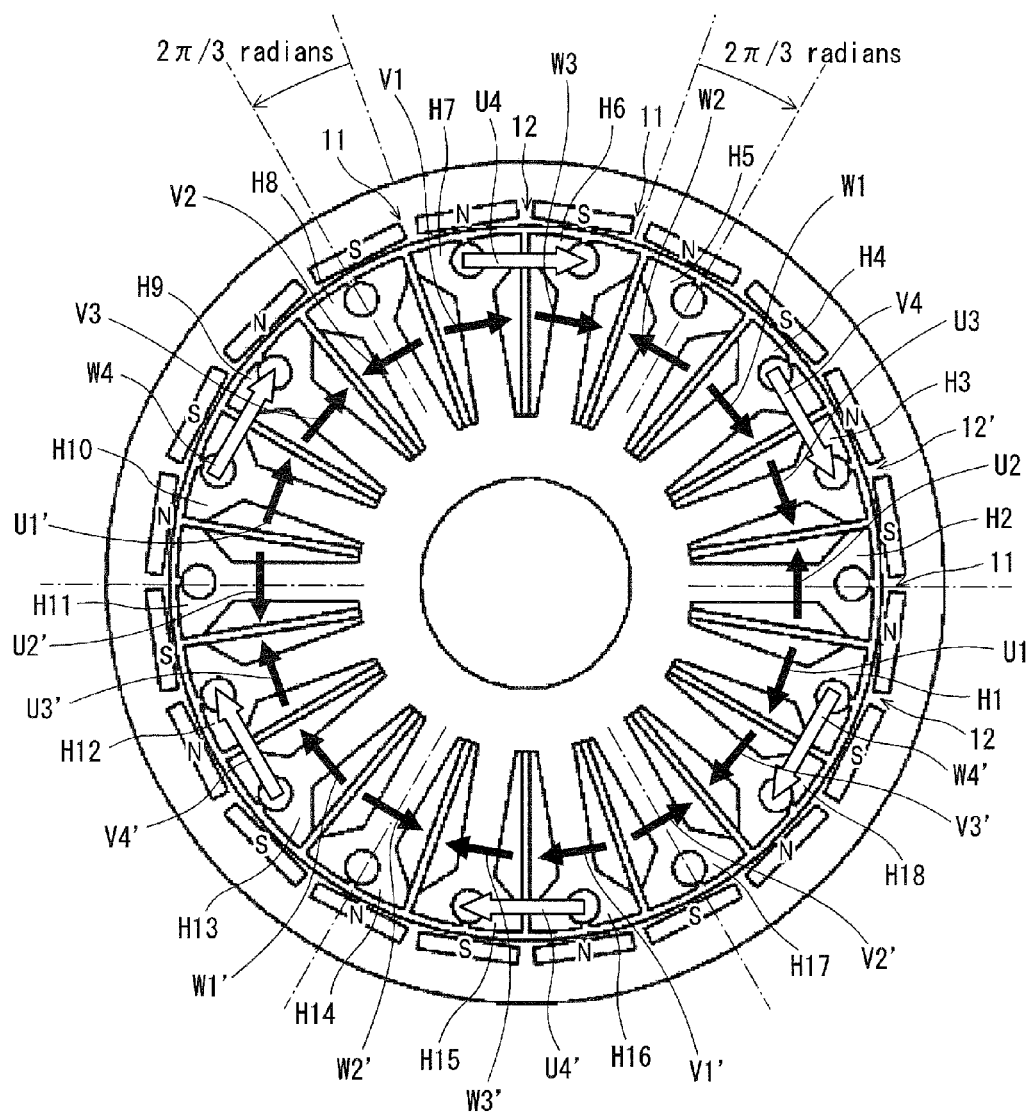
FIG. 2 is a plan view schematically showing the arrangement and winding directions of main coils and sub-coils of the synchronous motor shown in FIG. 1.
Figure 3:
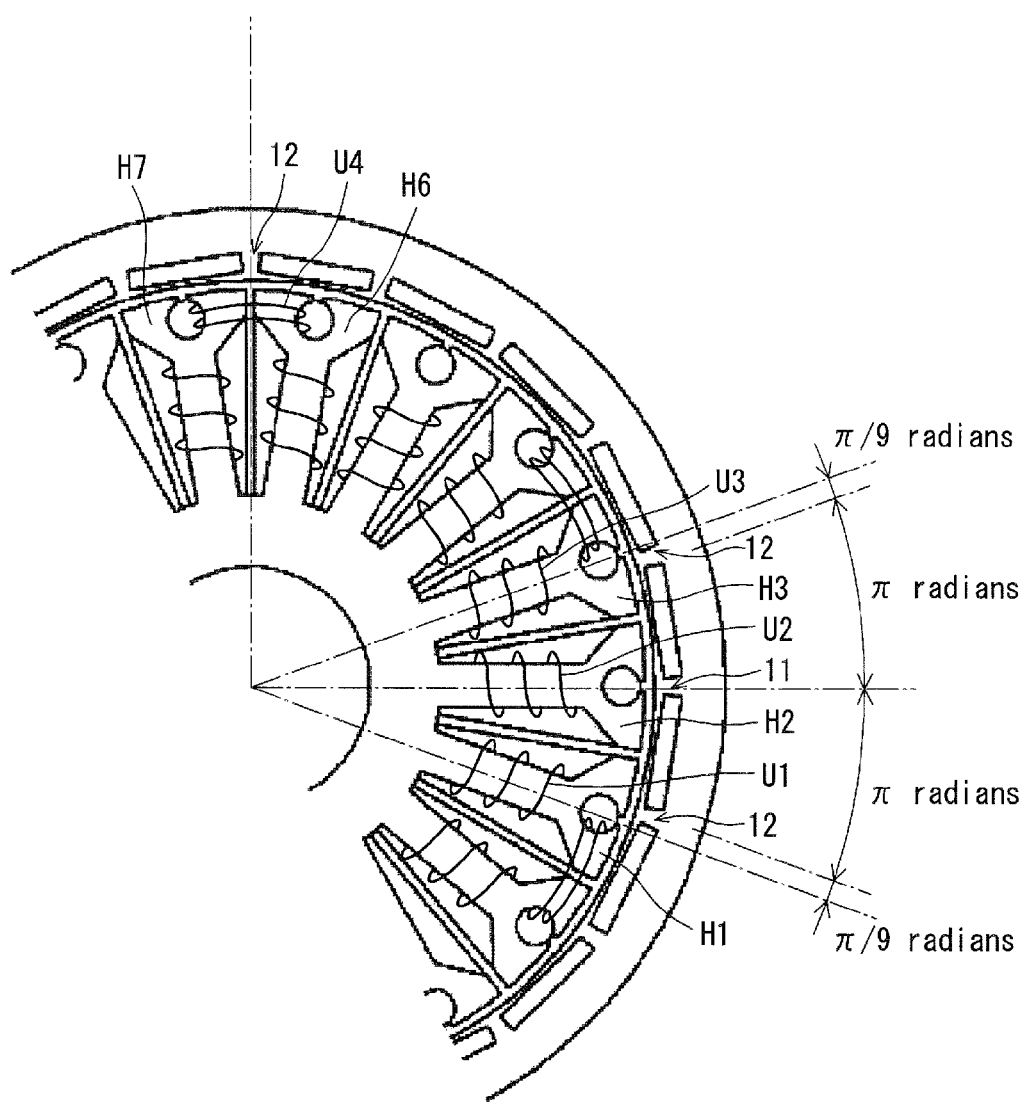
FIG. 3 is a fragmentary detail of the synchronous motor shown in FIG. 1.

FIG. 2 is a plan view schematically showing the arrangement and winding directions of the main coils and the sub-coils of the synchronous motor shown in FIG. 1. FIG. 3 is a fragmentary detail of the synchronous motor shown in FIG. 1.

In FIG. 2, the winding direction of each main coil 9 is shown by a solid arrow, whereas the winding direction of each sub-coil 10 is shown by an open arrow.

The main coils 9 include U-phase main coils U1, U2, U3, U1', U2', and U3', V-phase main coils V1, V2, V3, V1', V2', and V3', and W-phase main coils W1, W2, W3, W1', W2', and W3'.

The sub-coils 10 include U-phase sub-coils U4 and U4', V-phase sub-coils V4 and V4', and W-phase sub-coils W4 and W4'.

The permanent magnets 5 are arranged on the rotor 2 so that alternating North and South magnetic poles face the stator. In the figure, the letter "N" denotes a permanent magnet having North magnetic pole facing the stator, whereas the letter "S" denotes a permanent magnet having South magnetic pole facing the stator.

The stator teeth are denoted by H1-H18.

Focusing on the main coils U2, V2, and W2, the following is true with respect to the stator tooth H2 around which the main coil U2 is wound. That is, the stator tooth H8 around which the main coil V2 is wound is located $2\pi/3$ radians offset in electrical angle in the counterclockwise direction, whereas the stator tooth H5 around which the main coil W2 is wound is at located $2\pi/3$ radians offset in electrical angle in the clockwise direction.

Focusing now on the main coils U1, U2, and U3 (see FIG. 3), the following is true with respect to the stator tooth H2 around which the main coil U2 is wound. That is, the stator tooth H3 around which the main coil U3 is wound is located $(\pi+\pi/9)$ radians offset in electrical angle in the counterclockwise direction, whereas the stator tooth H1 around which the main coil U1 is wound is located $(\pi+\pi/9)$ radians offset in electrical angle in the clockwise direction.

Focusing now on the main coil U2 and the sub-coil U4 (see FIG. 3), the following is true. That is, the stator teeth H6 and H7 between which the sub-coil U4 is wound are at equal distances from the point that is $\pi$ radians offset from the stator tooth H2 around which the main coil U2 is wound. This positional relation is equivalent to the positional relation where the stator tooth around which the sub-coil U4 is wound is $\pi$ radians offset in electrical angle from the stator tooth H2. That is, the main coil U2 and the sub-coil U4 are $\pi$ radians offset in electrical angle from each other.

Note the winding directions of the main coils U1 and U3 and of the sub-coil U4 are opposite to the winding direction of the main coil U2.

The relation among the positions and winding directions of the main coils U1, U2 and U3 and the sub-coil U4 is also true substantially in the same way among the main coils V1, V2, and V3 and the sub-coil V4 and also among the main coils W1, W2, and W3 and the sub-coil W4.

The magnet torque reaches its maximum when the phase difference between the field of each permanent magnet 5 and the armature current is $\pi/2$ radians and reaches zero when the phase difference is 0 radians. In the state shown in FIG. 2, when the counterclockwise direction of the rotor 2 is taken as the forward direction, the stator tooth H2 around which the main coil U2 is wound faces the inter-polar gap 11 from South magnetic pole to North magnetic pole. In this state, by applying electric current to the main coil U2 in the winding direction indicated by the solid arrow, the magnet torque occurring between the permanent magnet and the main coil U2 is maximized.

In the state shown in FIG. 2, in addition, the sub-coil U4 faces the inter-polar gap 12 from North magnetic pole to South magnetic pole. In this state, by applying electric current to the sub-coil U4 in the winding direction indicated by the open arrow, the magnet torque occurring between the permanent magnet and the sub-coil U4 is maximized. Suppose that the sub-coil U4 is not provided, substantially no magnet torque is produced in this particular state, even if electric current is supplied to the main coils V1 and W3. This is because the stator tooth H6 around which the main coil W3 is wound as well as the stator tooth H7 around which the main coil V1 is wound is located at a position substantially facing a magnetic pole of the rotor 2 (the phase difference of $\pi/18$ radians in terms of electrical angle). That is, in the positional relation described above, the field of each permanent magnet 5 would not be effectively used for producing torque. In contrast, according to the present embodiment, the sub-coil U4 is provided (the phase difference of $\pi/2$ radians in electrical angle), which ensures that the field of each permanent magnet is effectively used for producing torque.

It should be further noted that the provision of different sub-coils to the same slit requires inter-phase insulation. According to the present embodiment, however, different sub-coils are not provided to the same slit. That is, the slit of any given stator tooth accommodates only one sub-coil that is wound between the given stator tooth and one of the two stator teeth circumferentially adjacent to the given stator tooth. This configuration eliminates the need for inter-phase insulation, so that the coil winding within each slit is allowed to occupy more space, which is advantageous to achieve the miniaturization and improved reliability.

Figure 4:
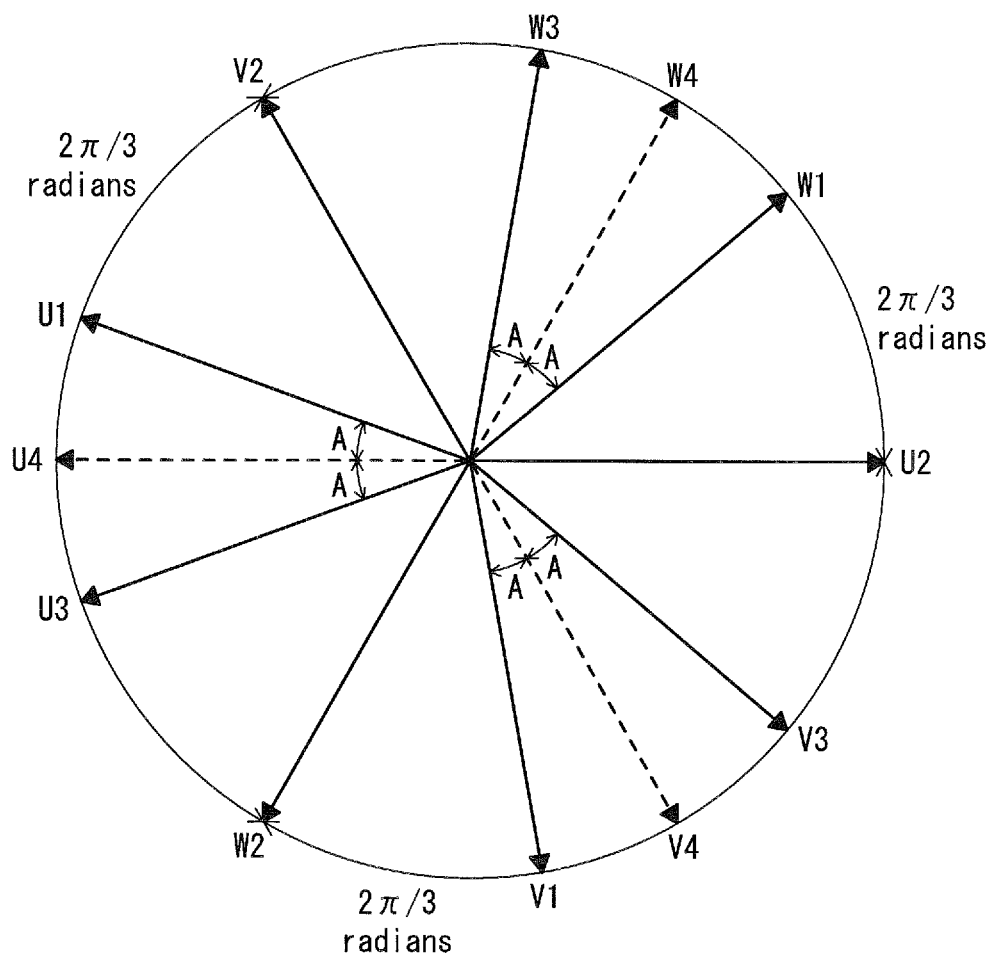
FIG. 4 is a vector diagram showing the magnitudes and phases of magnetic fields produced upon application of electric current to the coils of the synchronous motor shown in FIG. 1.

FIG. 4 is a vector diagram showing the magnitudes and phases of magnetic fields produced upon application of current to the coils of the synchronous motor shown in FIG. 1.

Focusing on the main coils U2, V2, and W2, it is noted that the magnetic fields having the phase difference of $2\pi/3$ radians are generated by those main coils. Focusing on the main coils U1, U2, and U3, the following relation is noted. That is, that main coil U1 generates a magnetic field having a phase that is $(\pi+\pi/9)$ ahead of the magnetic field generated by the main coil U2, and the main coil U3 generates a magnetic field having a phase that is $(\pi+\pi/9)$ behind the magnetic field generated by the main coil U2. A similar relation holds among the main coils V1, V2, and V3 and also among the main coils W1, W2, and W3. The above relations ensure to maximize the magnet torque generated between each main coil and the respective permanent magnet.

Focusing on the main coil U2 and the sub-coil U4, the sub-coil U4 generates a magnetic field having a phase that is $\pi$ radians offset from the magnetic field generated by the main coil U2. A similar relation holds between the main coil V2 and the sub-coil V4 and also between the main coil W2 and the sub-coil W4. The above relations ensure to maximize the magnet torque generated between each sub-coil and the respective permanent magnet.

In a manner described above, the first embodiment as a whole improves the torque.

<Synchronous Motor Drive System>

Next, the structure and operation of the synchronous motor drive system is described.

Figure 5:
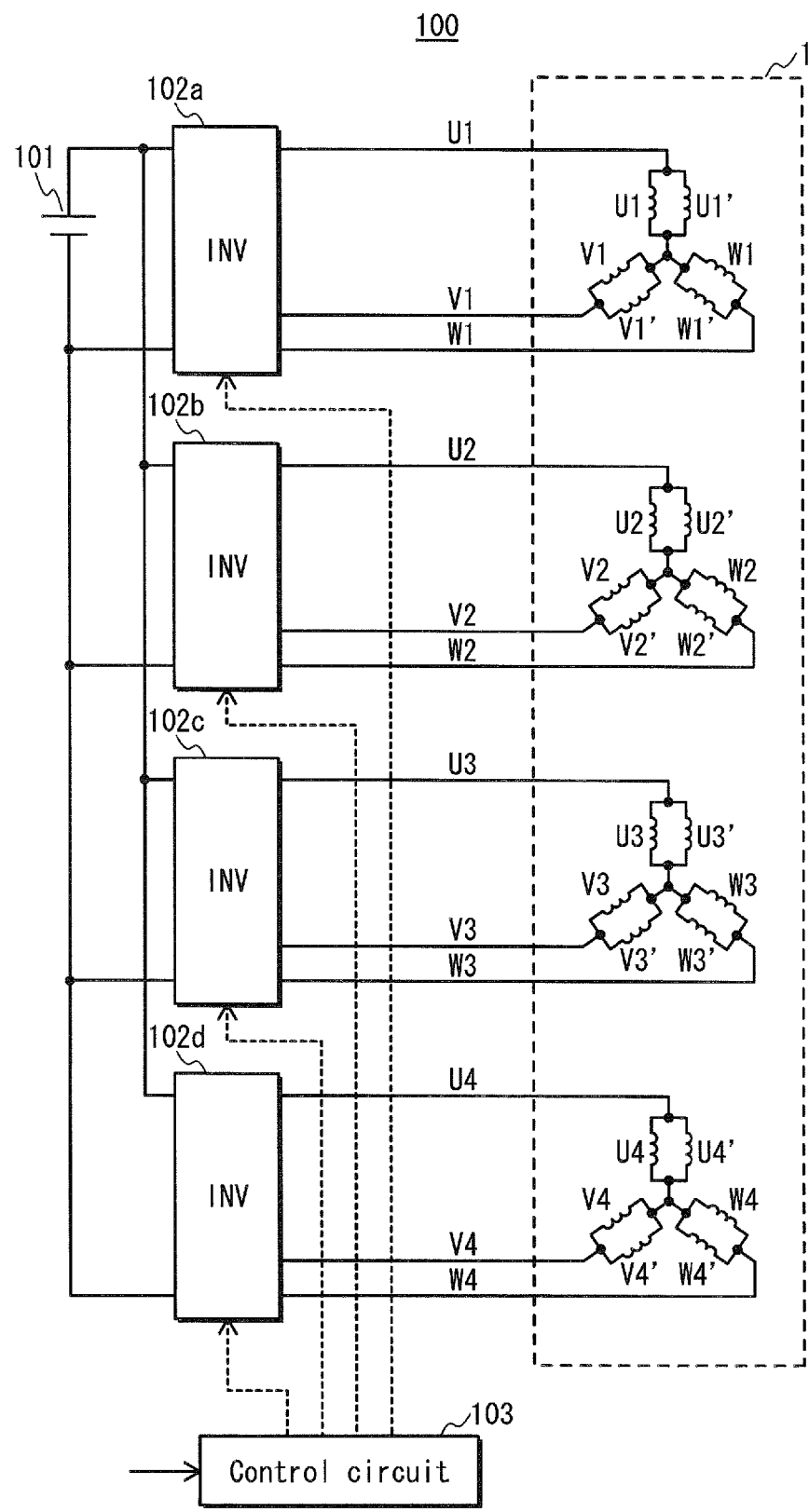
FIG. 5 is a plan view showing the structure of the synchronous motor drive system according to the first embodiment of the present invention.

FIG. 5 is a plan view of a synchronous motor drive system according to the first embodiment of the present invention.

The synchronous motor drive system 100 is composed of a synchronous motor 1 and a drive device. The drive device is composed of a direct current (DC) power source 101, inverters 102a, 102b, 102c, and 102d, and a control circuit 103. The inverters 102a, 102b, 102c, and 102d each generate three-phase alternating current and supply the current to the synchronous motor 1. Output currents U1, V1, W1 of the inverter 102a are each shifted in phase by $2\pi/3$ radians. A similar relation holds among output currents U2, V2, and W2 of the inverter 102b, among output currents U3, V3, and W3 of the inverter 102c, and among output currents U4, V4, and W4 of the inverter 102d.

Figure 6:
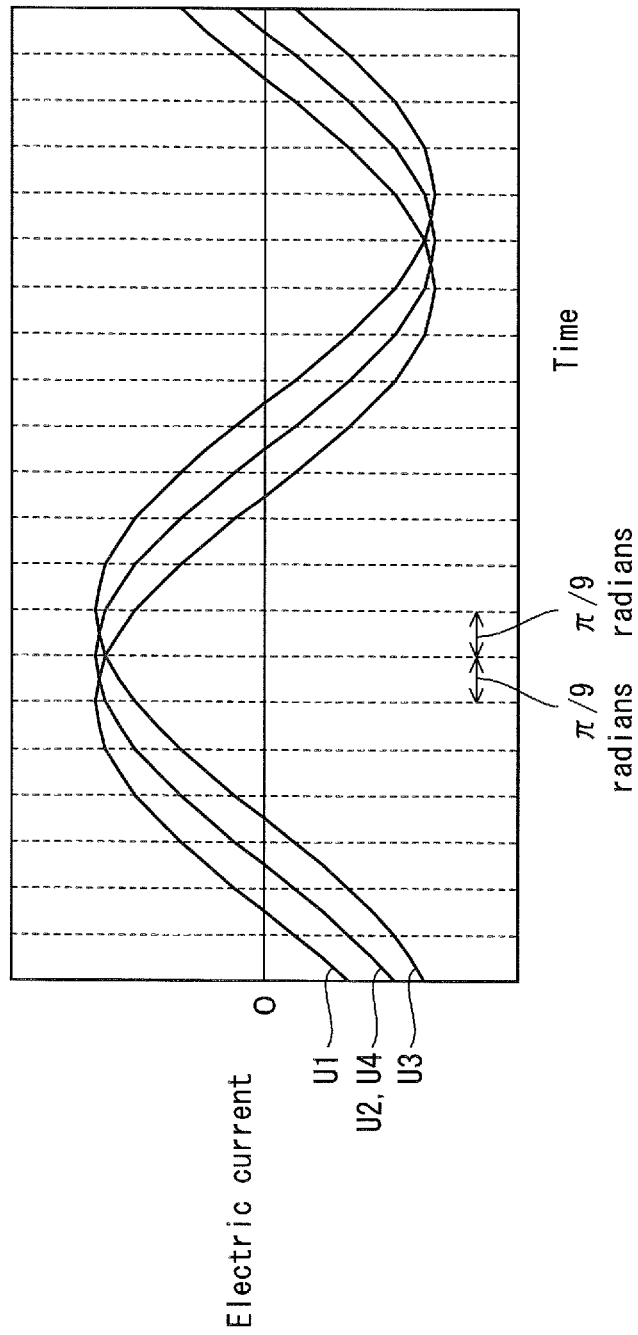
FIG. 6 is a view showing the waveforms of output currents U1, U2, U3, and U4.

With respect to output current U2, the phase of output current U1 is $\pi/9$ radians ahead, the phase of output current U3 is $\pi/9$ radians behind, and the phase of output current U4 is in the same phase. A similar relation holds among output currents V1, V2, V3, and V4 and also among output currents W1, W2, W3, and W4. FIG. 6 shows the waveforms of output currents U1, U2, U3, and U4. The phase difference between output currents U1 and U2 is $\pi/9$ radians. However, the phase difference between magnetic fields produced by the respective main coils U1 and U2 is $(\pi+\pi/9)$ radians because the winding directions of the respective main coils U1 and U2 are opposite. Similarly, the phase difference between output currents U2 and U4 is 0 radians, but the phase difference between magnetic fields produced by the respective main coils U2 and U4 is $\pi$ radians because the winding directions of the respective main coils U2 and U4 are opposite.

The control circuit 103 separately controls operation of the individual inverters 102a, 102b, 102c, and 102d. More specifically, the control circuit 103 generates gate drive signals for the respective invertors all based on a torque command signal and a rotational-speed command signal received from an external source and output the resulting gate drive signals to the respective invertors.

Figure 7:
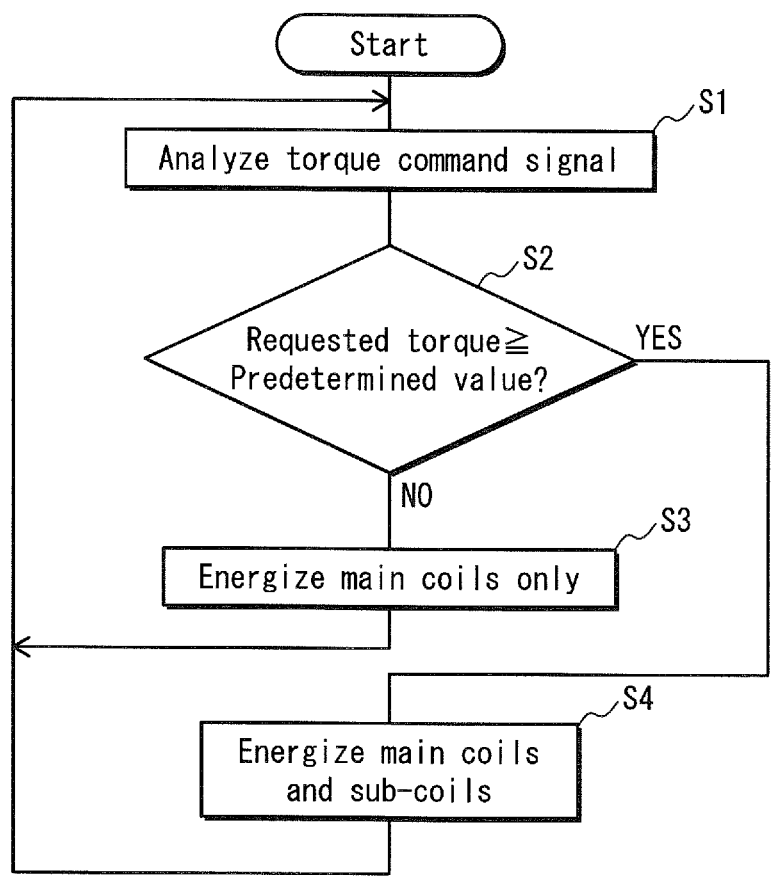
FIG. 7 is a flowchart of an exemplary operation of a control circuit.

FIG. 7 is a flowchart of an exemplary operation of the control circuit shown in FIG. 5.

The control circuit 103 analyzes a torque command signal received from the external source (Step S1). If the requested torque is less than a predetermined value (S2: NO), the control circuit 103 supplies electric current only to the main coils (Step S3). On the other hand, if the requested torque is equal to the predetermined value or greater (Step S2: YES), the control circuit 103 supplies electric current to both the main coils and the sub-coils (Step S4). Specifically, in Step S3, the control circuit 103 activates the inverters 102a, 102b, and 102c and deactivates the inverter 102d. In Step S4, the control circuit 103 activates all the inverters 102a, 102b, 102c, and 102d. As described above, the present embodiment provides an option of supplying electric current to the sub-coils when it is desired to increase the maximum torque. By not supplying electric current to the sub-coils in normal times, the initial temperature of the sub-coils is maintained relatively low. Consequently, the sub-coils are enabled to pass electric current of larger magnitude than at the normal times, although passing such electric current is possible only for a relatively short time period. The present embodiment can therefore provide a compact and high-torque synchronous motor.

<Modification of Waveforms>

The following describes modifications of output currents U1, U2, U3, and U4.

Figure 8:
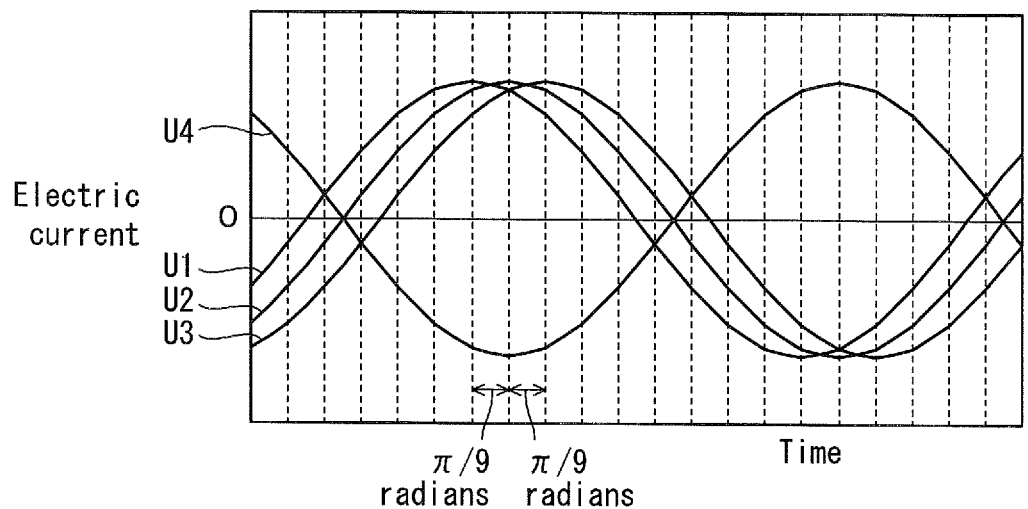
FIG. 8 is a view showing a modification of the output currents.

In the example shown in FIG. 8, the phase of output current U4 is shifted by $\pi$ radians from the phase of output current U2. This modification is effective when the winding directions of the main coil U2 and the sub-coil U4 are the same.

Figure 9:
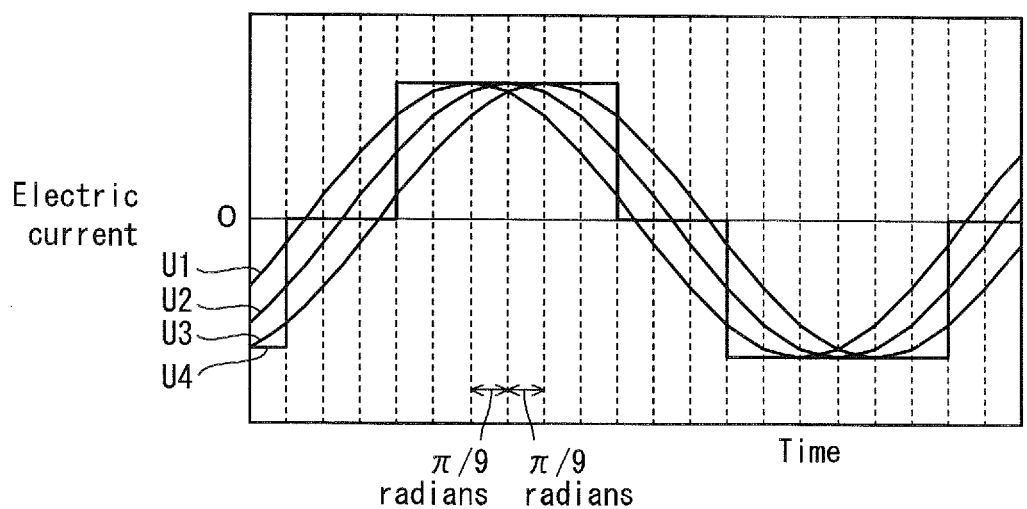
FIG. 9 is a view showing another modification of the output currents.

In the example shown in FIG. 9, each of output currents U1, U2, and U3 is a sine wave, whereas output current U4 is a rectangular wave. With this modification, the torque is increased as compared with the torque that would be obtained with output current U4 being a sine wave. In practice, an attempt of generating a sine wave through pulse-width modulation may result in a wave more or less having harmonic components superimposed on a pure sine wave. The "sine wave" used in this specification refers to a pure sine wave and also to a practical sine wave having harmonic components. It is also noted that an attempt of generating a rectangular wave in practice may result in that a leading edge and/or a trailing edge does not rise or fall instantaneously or that overshoot and/or undershoot is superimposed. The "rectangular wave" used in this specification refers to a pure rectangular wave and also to practical rectangular waves as described above.

Figure 10:
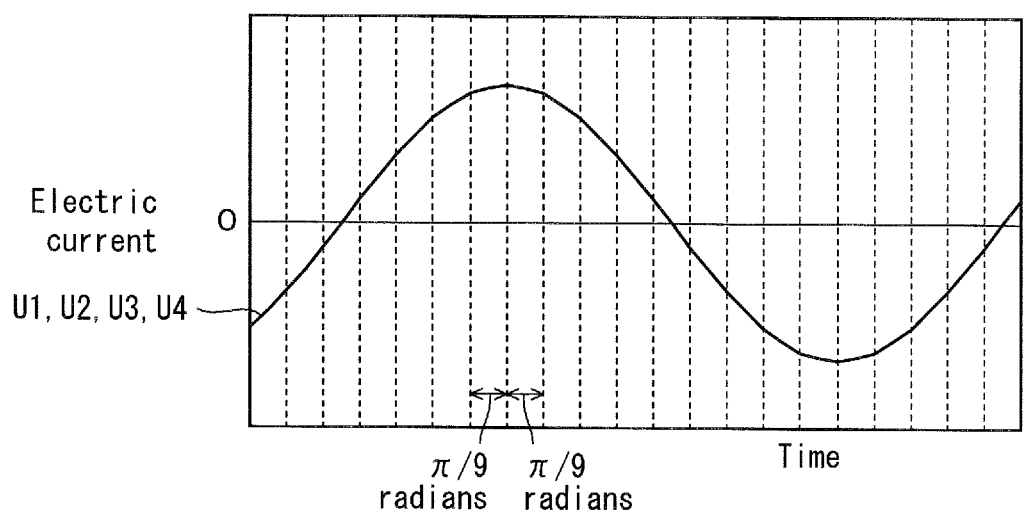
FIG. 10 is a view showing another modification of the output currents.

In the example shown in FIG. 10, the waveforms of output currents U1, U2, U3, and U4 all have the same phase. In this modification, since no phase difference needs to be provided between output currents, the number of inverters may be reduced. For example, one inverter may be used to produce output currents U1, U2, and U3, whereas another inverter may used to produce output current U4. In this case, only two inverters are necessary.

Figure 11A:
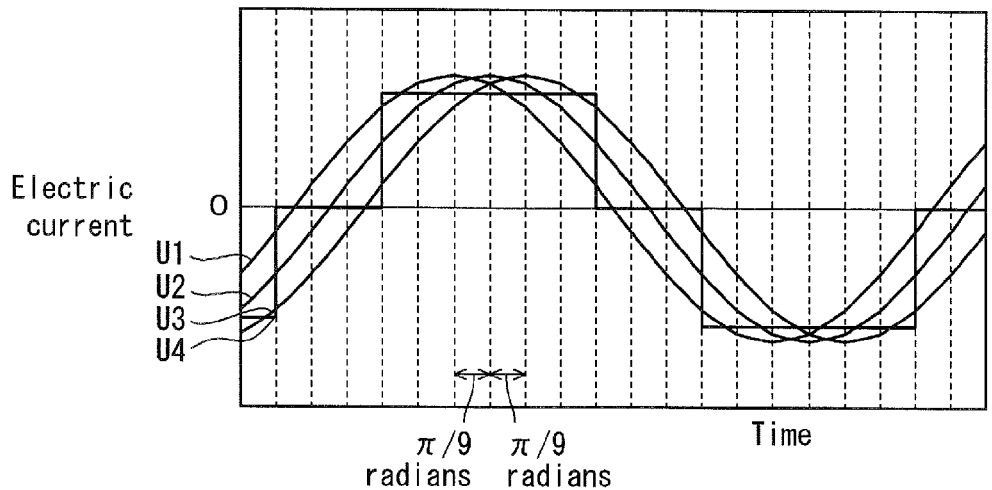
FIGS. 11A, 11B, and 11C are views showing other modifications of the output currents.
Figure 11B:
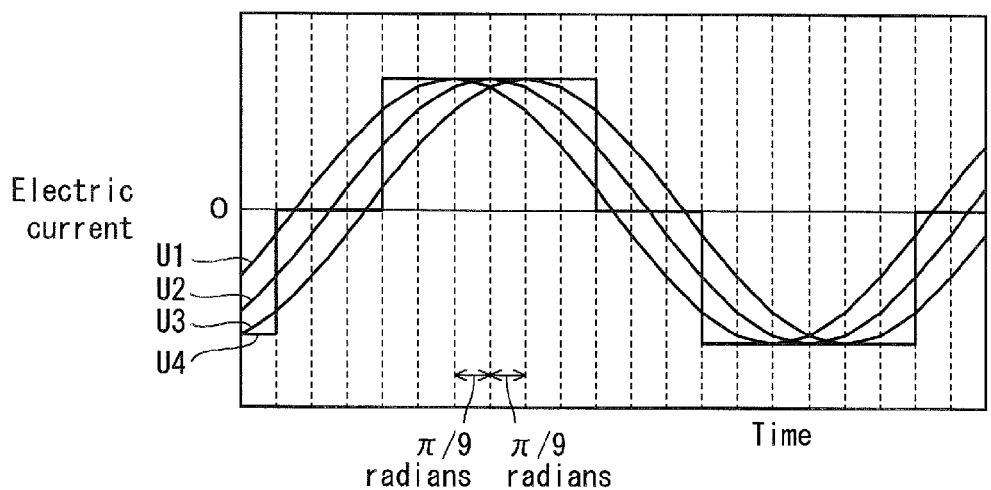
Figure 11C:
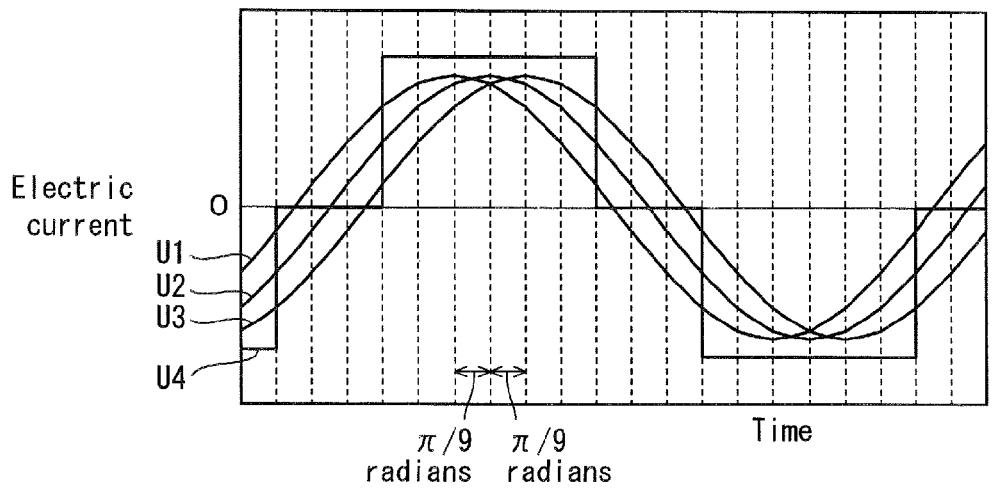

In the example shown in FIG. 11A, the magnitude of output current U4 is made smaller than that of output currents U1, U2, and U3. In the example shown in FIG. 11B, the magnitude of output current U4 is made equal to that of the output currents U1, U2, and U3. In the example shown in FIG. 11C, the magnitude of output current U4 is made greater than that of output currents U1, U2, and U3. As described above, the magnitude of electric current passed to the main coils is not required to be equal to the magnitude of electric current passed to the sub-coils. Note, in addition, that the output current U4 is not limited to a rectangular wave and may be a sine wave instead.

Figure 12A:
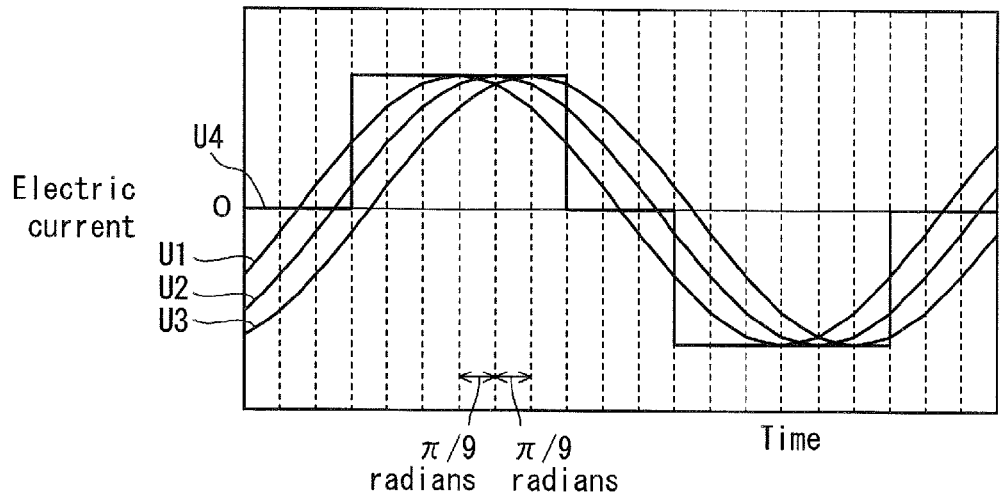
FIGS. 12A, 12B, and 12C are views showing other modifications of the output currents.
Figure 12B:
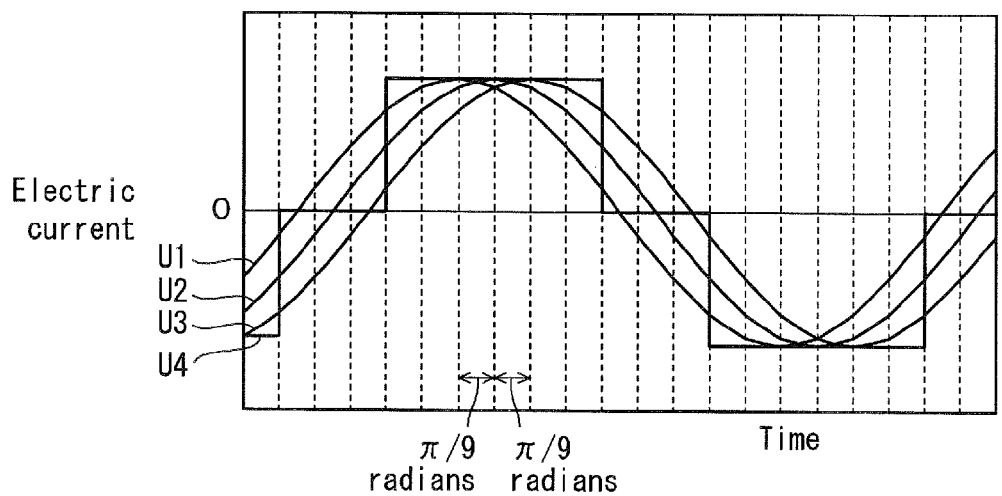
Figure 12C:
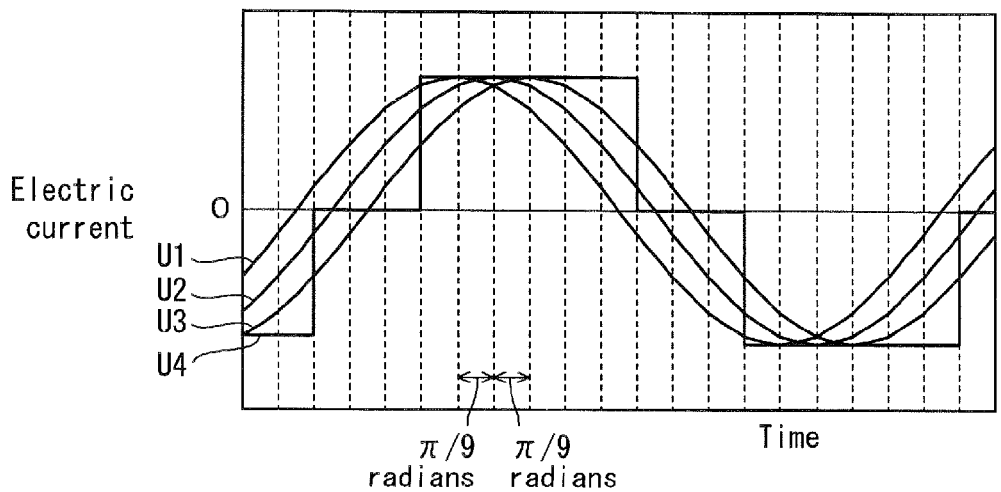

In the example shown in FIG. 12A, the phase of output current U4 is ahead of the phase of the output current U2. In the example shown in FIG. 12B, the phase of output current U4 is the same as the phase of output current U2. In the example shown in FIG. 12C, the phase of output current U4 is behind the phase of output current U2. As described above, it is not necessary that output current U4 be in phase with output current U2. In view of the reluctance torque additionally to the magnet torque, there are cases where it is preferable to shift the phase of output current U4 from the phase of output current U2. The above modifications are effective especially in such cases. Specific details are described below. Note that the output current U4 is not limited to a rectangular wave and may be a sine wave instead.

Here, the phase of output current resulting in the maximum magnet torque is taken as a reference (hereinafter, "reference phase"). Then, when the phase of output current is ahead of the reference phase, the magnet torque decreases but the reluctance torque increases. The contribution to the composite torque (total of reluctance torque and magnet torque) by the reluctance torque increases as the output current is larger.

When output current U4 is relatively large and output currents U1, U2, and U3 are relatively small, the effect of reluctance torque by output current U4 is expected to be achieved. However, the effect of reluctance torque by output currents U1, U2, and U3 cannot be expected. In such a case, the phase of output current U4 is adjusted to be ahead of the reference phase, whereas the output currents U1, U2, U3 are adjusted to be in phase with the reference phase. With this arrangement, the composite torque produced by output current U4 is increased while also increasing the composite torque produced by output currents U1, U2, and U3, so that the overall torque is increased.

When output current U4 is relatively small and output currents U1, U2, and U3 are relatively large, the effect of reluctance torque by output currents U1, U2, and U3 may be expected to be achieved. However, the effect of reluctance torque by output current U4 cannot be expected. In such a case, the phase of output currents U1, U2, and U3 is adjusted to be ahead of the reference phase, whereas the output current U4 is adjusted to be in phase with the reference phase. With this arrangement, the composite torque produced by output currents U1, U2, U3 is increased while also increasing the composite torque produced by output current U4, so that the overall torque is increased.

By advancing the phase of output current relative to the reference phase, the effect of weakening the field of permanent magnet is achieved. In response to increase of the rotational speed of the motor, the terminal voltage of the motor increases. Normally, if the terminal voltage of a motor reaches the source voltage or higher while the motor is rotating at high speed, the motor can no longer be driven. However, by exerting control to weaken the field of permanent magnets, the terminal voltage of the motor is lowered and thus the maximum rotational speed increases.

In one example to exert such control, the phase of output current U4 may be adjusted to be largely ahead of the reference phase and output currents U1, U2, and U3 are adjusted to be in phase with the reference phase or the phase of output currents U1, U2, and U3 are adjusted to be ahead of the reference phase to effectively use the reluctance torque. In this case, the effect of weakening the field achieved by output current U4 serves to lower the terminal voltage of the motor. Consequently, the rotational speed increases so that the output of the motor is improved. That is, the above control is effective to increase the rotational speed to improve the output of the motor without substantial torque reduction.

Alternatively, the phase of output currents U1, U2, and U3 may be adjusted to be largely ahead of the reference phase, and output current U4 may be adjusted to be in phase with the reference phase or the phase of output current U4 may be adjusted to be ahead of the reference phase to effectively use the reluctance torque. In this case, the effect of weakening the field is produced by output currents U1, U2, and U3, which serves to lower the terminal voltage of the motor. Consequently, the rotational speed increases to improve the output of the motor. This control is effective to largely reduce the terminal voltage to increase the rotational speed.

<Torque Characteristics>

Next, a description is given of the torque characteristics of the synchronous motor according to the present embodiment. The torque of the synchronous motor having the structure shown in FIG. 1 was simulated by passing electric current in three manners described below.

(a) To pass electric current only to the main coils.
(b) To pass electric current to both the main coils and the sub-coils and the electric current passed to the sub-coils was a sine wave.
(c) To pass electric current to both the main coils and the sub-coils and the current passed to the sub-coils was a rectangular wave.

Figure 13A:
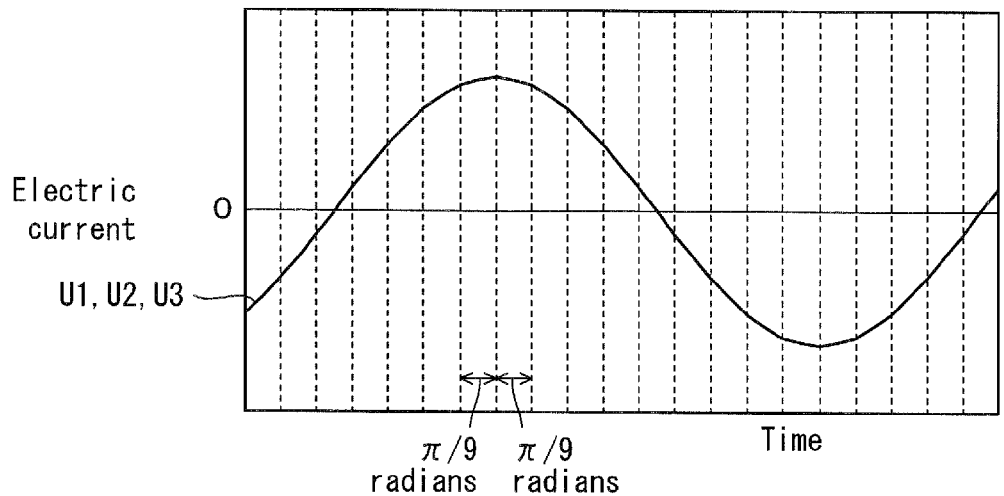
FIGS. 13A, 13B, and 13C views showing the waveforms of the output currents U1, U2, U3, and U4 used in simulations.
Figure 13B:
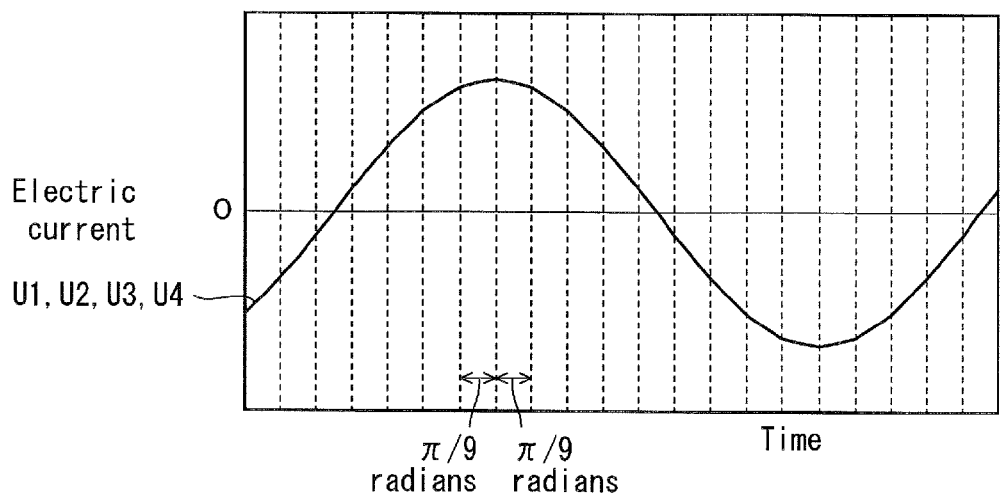
Figure 13C:
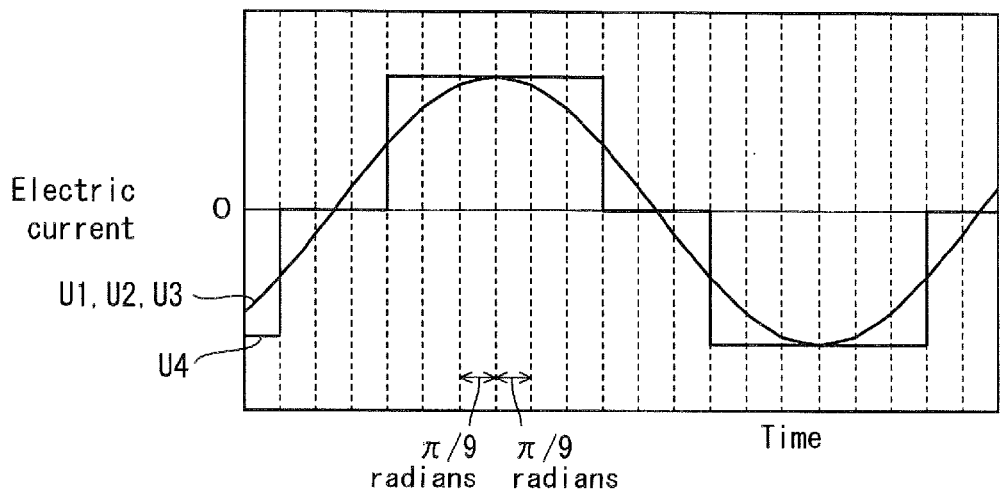
Figure 14:
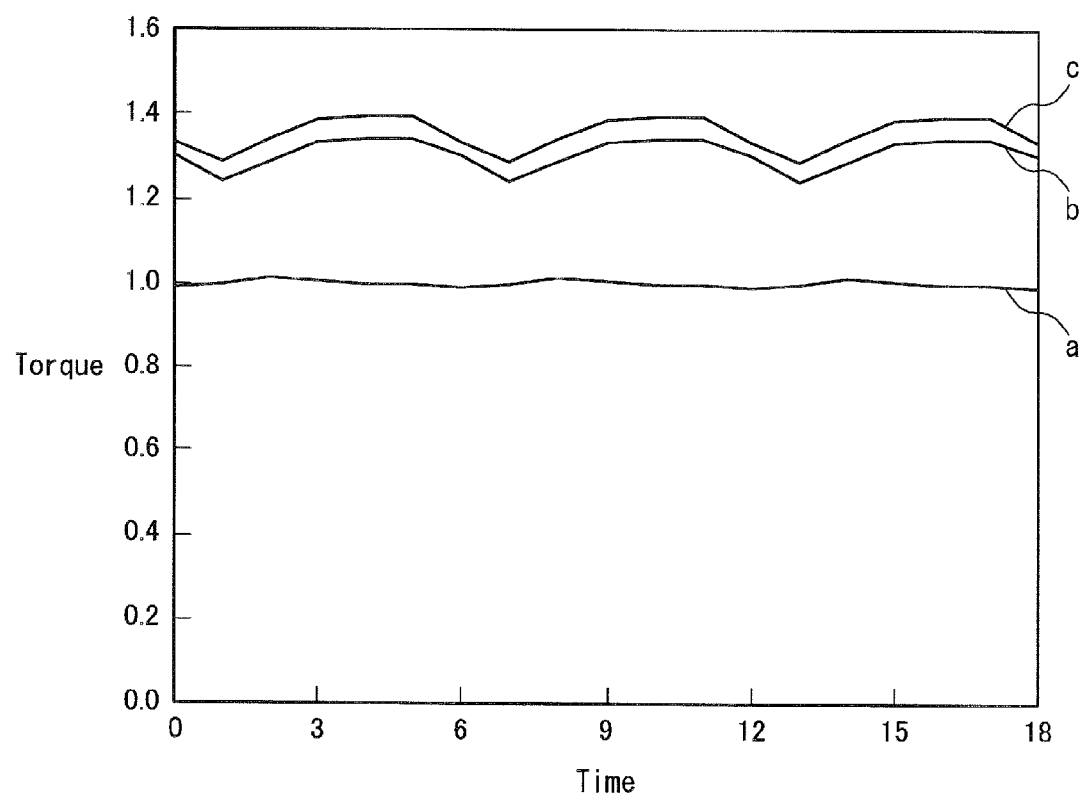
FIG. 14 is a view showing the torque obtained by the simulations.

FIGS. 13A, 13B, and 13C show the waveforms of output currents U1, U2, U3, and U4 obtained in response to electric current supplied in the above manners (a), (b), (c), respectively. In these figures, output currents U1, U2, U3, and U4 are all shown to have the same phase. In FIG. 14, plotted lines a, b, c show the torque obtained in response to electric current supplied in the above manners (a), (b), and (c). The simulations show that the torque improves by passing the electric current to both the main coils and the sub-coils than by passing the electric current only to the main coils. The simulations also show that the torque improves more by passing to the sub-coils a rectangular wave rather than a sine wave.

<Supplemental Explanation>

According to the present, the stator teeth of the synchronous motor are arranged at equally spaced intervals. Alternatively, however, the stator teeth may be arranged at unequal intervals. Even if the stator teeth are arranged at unequal intervals, the same advantageous effect is obtained by supplying electric currents each adjusted to have an appropriate phase in view of the positional relation with magnetic poles of the rotor and the coils wound around the respective stator teeth.

In addition, a modification may be made such that the stator teeth and/or the rotor magnetic poles are skewed in the direction of the rotation axis. This modification achieves to smooth out magnetic flux variations, which leads to a lower-vibration synchronous electric motor.

Furthermore, by using powdered iron cores, laminated magnetic material, or amorphous magnetic material for the magnetic material in the stator, iron loss can be greatly reduced and thus a higher-efficiency synchronous electric motor can be achieved.

In addition, by employing multiple permanent magnets to comprise one magnetic pole, the eddy current losses that occur due to the permanent magnets can be reduced and a higher-efficiency synchronous electric motor can be achieved.

Also, the surface area of a coil may be increased by using a small-diameter wire or a flat rectangular wire, which serves to reduces the skin effects during high-frequency driving and provide a high-efficiency synchronous electric motor.

Note that the present embodiment focuses exclusively on the magnet torque generated by permanent magnets. Thus, the phase adjustment is made such that the electric current flowing through each coil is maximized when a stator tooth around which the coil is wound comes to a position to face an inter-polar gap. It should be noted, however, that the synchronous motor according to the present embodiment is a so-called an interior permanent magnet synchronous motor, which has permanent magnets arranged inside the rotor core. The synchronous motor utilizes reluctance torque resulting from a difference in magnetoresistance, along with the magnet torque generated by the magnets. In order to maximize the torque by utilizing both the magnet torque and the reluctance torque, it is in some cases effective to advance the phase of electric current than the phase adjusted to be maximized when passing through a coil wound around a stator tooth that is positioned to face an inter-polar gap.

According to the present embodiment, in addition, the main coils and sub-coils are each wound around in concentrated winding. Therefore, the size of so-called coil end, i.e., the winding of each coil located at the end face of a stator, is recued, which is effective to reduce the size of synchronous motor. Also, the coil ends are sections that do not contribute to torque even when electric current flows therein, but leads to occurrence of copper loss, which is joules lost due to coil resistance when electric current is flowing. Therefore, reducing the size of coil ends is effective to reduce copper loss, which leads to a higher-efficiency synchronous electric motor.

Note, in addition, that the synchronous motor employed in the present invention is of a so-called outer-rotor type, i.e. the rotor is arranged at the outer perimeter of the stator. Therefore, the rotor diameter of outer-rotor type motor can be increased in comparison to an inner-rotor type motor of the same volume. Accordingly, reduction of effective magnetic flux is prevented with no need to reduce the size of the permanent magnets, even in a synchronous motor that has 20 magnetic poles such as that of the present embodiment.

In the synchronous motor of the present embodiment, the number of rotor magnetic poles is 20 and the number of stator teeth is 18. However, the number of stator teeth may be 9, 27, or any other multiple of 9, and the number of rotor magnetic poles may be any multiple of 10, such that the combination is 10q poles to 9q teeth (q being a positive integer). This allows for the above-described positional relationships in terms of electrical angle, thus obtaining the same effects. Alternatively, the combination is 8q poles to 9q teeth (q being a positive integer) or of 10q poles to 12q teeth (q being a positive integer) also allows for the same effect to be achieved.

According to the present embodiment, in addition, a group of stator teeth H1 through H9 and a group of stator teeth H10 through H18 are arranged symmetrical about the axis. Therefore, the resultant attractive force in the radial direction due to stator teeth is zero. Accordingly, no adverse effect upon the lifespan of the axis is produced, thereby achieving a synchronous motor with a long lifespan. Similarly, with 30 magnetic poles and 27 teeth, three stator teeth groups are formed at every 120° in mechanical angle. Therefore, the resultant attractive force in the radial direction due to stator teeth is zero.

As described above, the present embodiment allows the maximum torque to be increased as necessary and ensures to provide a synchronous motor that is compact, high-output, low-vibration, low-noise, and efficient.

Second Embodiment

According to the first embodiment, the synchronous motor has 18 main coils and only 6 sub-coils. According to the second embodiment, however, the synchronous motor has 18 main coils and 18 sub-coils. Except for the number of sub-coils, the structure of the synchronous motor according to this embodiment is identical to that explained for the first embodiment 1. Therefore, such explanation is omitted below.

Figure 15:
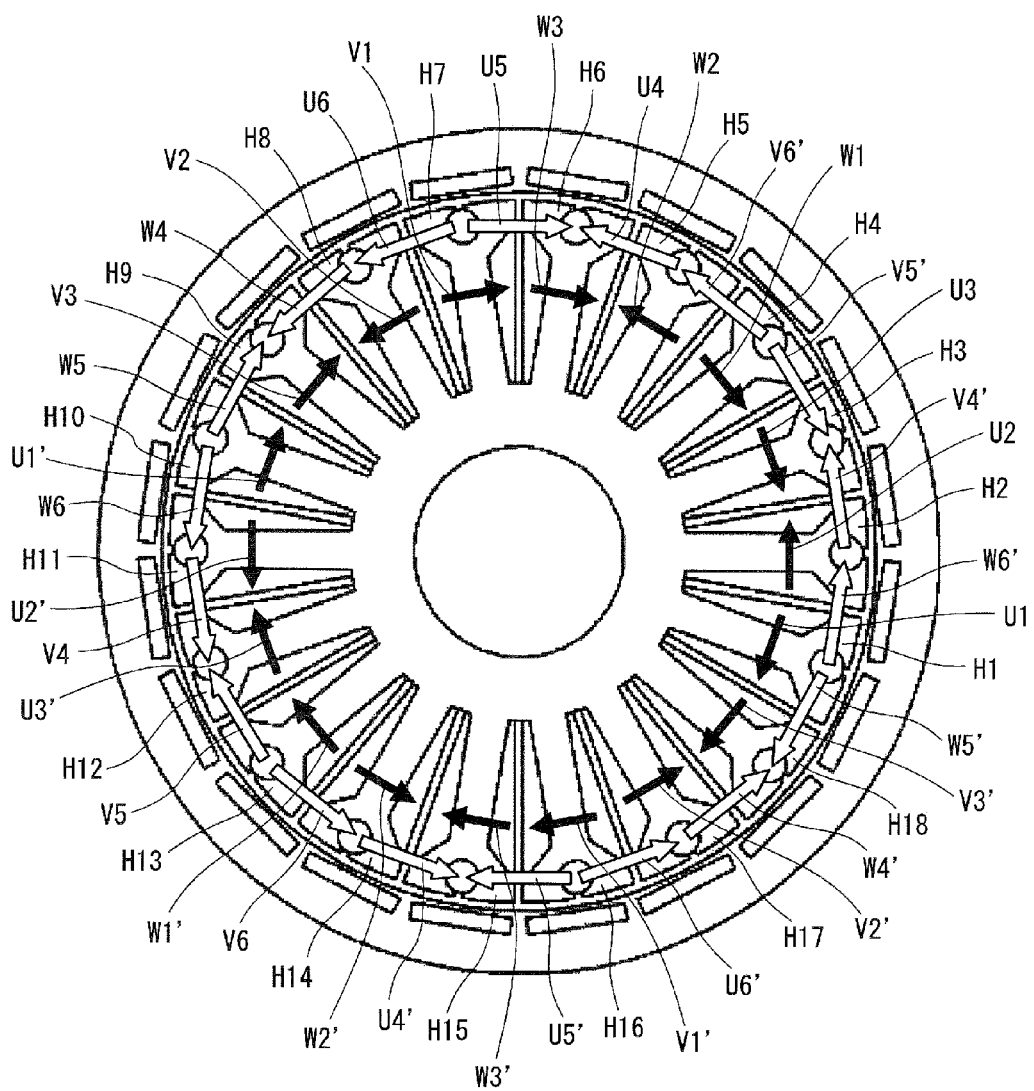
FIG. 15 is a plan view schematically showing the arrangement and winding directions of main coils and sub-coils of a synchronous motor according to a second embodiment of the present invention.

FIG. 15 is a plan view schematically showing the arrangement and winding directions of main coils and sub-coils of the synchronous motor according to the second embodiment of the present invention.

In the synchronous motor 21, the main coils 9 include U-phase main coils U1, U2, U3, U1', U2', and U3', V-phase main coils V1, V2, V3, V1', V2', and V3', and W-phase main coils W1, W2, W3, W1', W2', and W3'.

The sub-coils 10 include U-phase sub-coils U4, U5, U6, U4', U5', and U6', V-phase sub-coils V4, V5, V6, V4', V5', and V6', and W-phase sub-coils W4, W5, W6, W4', W5', and W6'.

As a consequence, with respect to any main coil, one sub-coil is located at a position that is $\pi$ radians offset in electrical angle.

Figure 16:
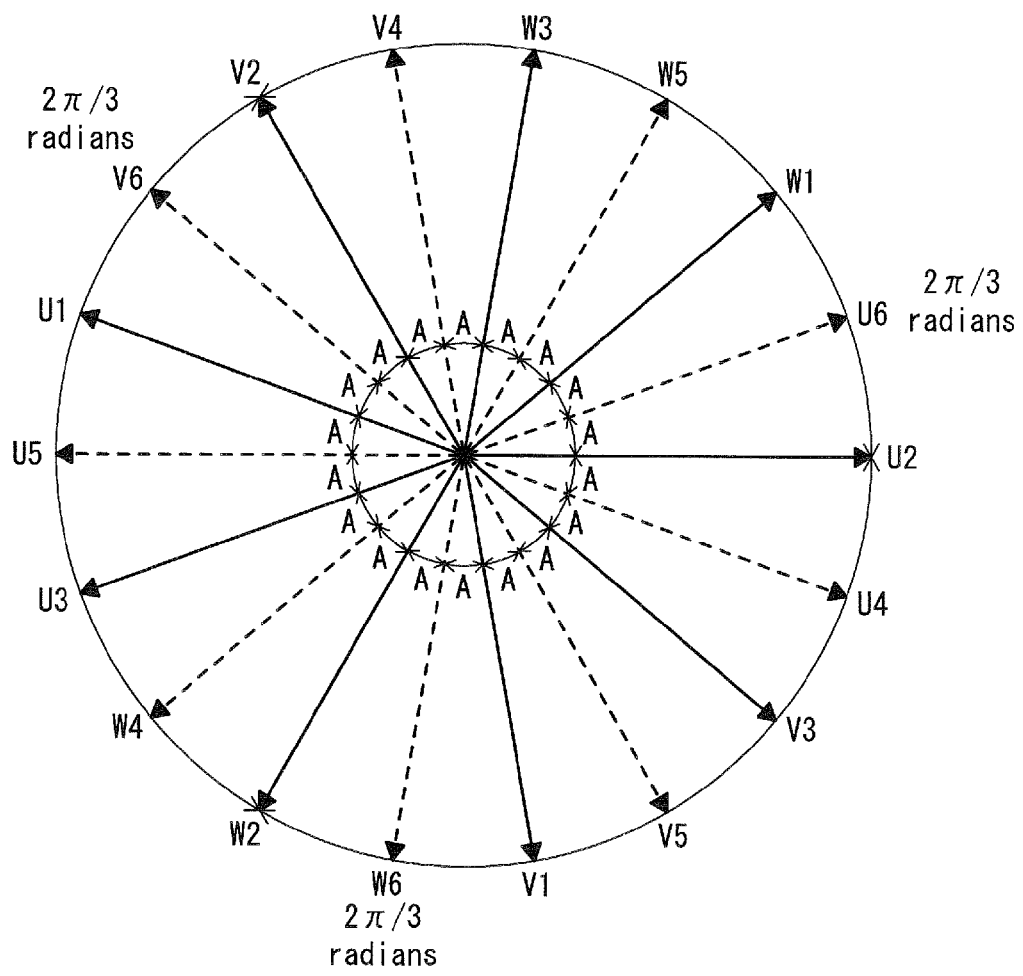
FIG. 16 is a vector diagram showing the magnitudes and phases of magnetic fields produced upon application of electric current to the coils of the synchronous motor shown in FIG. 15.

FIG. 16 is a vector diagram showing the magnitudes and phases of magnetic fields produced upon application of electric current to the coils of the synchronous motor shown in FIG. 15.

Focusing on the main coils U1, U2, and U3 and the sub-coils U4, U5, and U6, the following is true. That is, the sub-coil U4 produces a magnetic field having a phase that is $\pi$ radians offset from the magnetic field of the main coil U1. The sub-coil U5 produces a magnetic field having a phase that is $\pi$ radians offset from the magnetic field of the main coil U2. The sub-coil U6 produces a magnetic field having a phase that is $\pi$ radians offset from the magnetic field of the main coil U3. A similar relation holds among the main coils V1, V2, and V3 and the sub-coils V4, V5, and V6 and also among the main coils W1, W2, and W3 and the sub-coils W4, W5, and W6. The above relations ensure to maximize the magnet torque generated between each main coil and the respective permanent magnet.

According to the present embodiment, the slit of any given stator tooth accommodates two sub-coils, one of which is wound between the given stator tooth and one of the two stator teeth circumferentially adjacent to the given stator tooth and another of which is wound between the given stator tooth and the other circumferentially adjacent stator tooth. This structure ensures the effective use of magnetic flux of the rotor at a maximum level, so that a compact and high-torque synchronous motor is provided.

In addition, different from the first embodiment according to which a three-phase alternating current is supplied to the sub-coils, nine-phase alternating current is supplied to the sub-coils according to the present embodiment. By increasing the number of phased of alternating current supplied to the sub-coils, the torque ripple is reduced.

Up to this point, the present invention has been described by way of the embodiments. However, the present invention is not limited to the specific embodiments described above. For example, the following modifications may be made.

(1) According to the embodiments described above, the main coils and sub-coils are wound around stator teeth. However, the present invention is not limited to such and applicable to a so-called core-less motor having no stator teeth.

(2) Although not specifically mentioned in the above embodiments, a skew structure may be adopted for the stator coils. With a skew structure, the stator teeth are circumferentially skewed progressively along the axis direction of the rotor by, at most, the interval between two adjacent stator coils.

(3) The embodiments above exemplify an outer-rotor type synchronous motor in which the rotor is disposed outside the stator. However, the same effect can be achieved by an inner-rotor type synchronous motor in which the rotor is disposed inside the stator, a so-called axial gap type synchronous motor in which the rotor and the stator are disposed with a space therebetween in the axial direction, and a synchronous motor with a combination of these structures.

(4) In the embodiments above, the magnetic poles of the rotor are constituted by permanent magnets. However, the present invention is applicable to synchronous motors using reluctance torque generated from a difference in magnetoresistance, and synchronous motors which include a combination of permanent magnets and reluctance torque in the rotor.

(5) The present invention is not limited to synchronous motor, but may also be applied to synchronous generators, and to a directly driven linear synchronous motor or linear synchronous generator.

(6) The present invention provides a synchronous motor that is small, high-output, low-vibration, low-noise, and efficient. This synchronous motor is particularly useful for automobiles, for which low-vibration and low-noise motors are in desired.

(7) According to the embodiments above, the manner of supplying electric current is switched between supplying electric current only to the main coils and to both the main coils and sub-coils. However, the present invention is not limited to such. The present invention is also applicable to the case where electric current is supplied to both the main and sub-coils at all times. Even in such a case, all the modifications shown in FIGS. 6 and 8-12 are similarly applicable.

(8) According to the embodiments above, three inverters are employed to shift the phase of each output current U1, U2, and U3 by π/9 radians so as to shift the phase of each magnetic field produced by the stator teeth H1, H2, and H3 by (π+π/9) radians. However, the present invention is not limited to such. In one example, the stator tooth H2 only has a main coil of U-phase wound therearound, whereas the stator tooth H1 has a main coil of U-phase and a main coil of V-phase wound therearound, and the stator tooth H3 has a main coil of U-phase and a main coil of W-phase wound therearound. By providing coils of two different phases to each of the stator teeth H1 and H3, the phase of magnetic field produced by each of the stator teeth H1 and H3 is shifted with respect to the stator tooth H2. Note that the amount of phase shift in magnetic field may be adjusted by changing the ratio of the number of windings between the two main coils. With this modification, one inverter is sufficient to shift the phase of magnetic field produced by each of the stator teeth H1, H2, and H3 by (π+π/9) radians.

(9) According to the embodiments above, the torque characteristics are changed as necessary. However, the present invention is not limited to such. In one alternative example, electric current is supplied to both the main coils and sub-coils, and at least one of the magnitude, phase, and waveform of the current is made to differ between the main coils and the sub-coils.

(10) According to the embodiments above, each stator tooth has a slit formed at the tip thereof. With the above structure, all the stator teeth are ensured to have the same saliency, so that the torque ripple is reduced. However, the present invention is not limited to such. In one alternative example, only those stator teeth around which a sub-coil is wound have a slit, whereas those stator teeth around which a sub-coil is not provided do not have any slit. A stator tooth not having a slit has a larger volume as composed with a stator tooth having a slit. Consequently, occurrence of magnetic saturation is reduced.

Figure 17A:
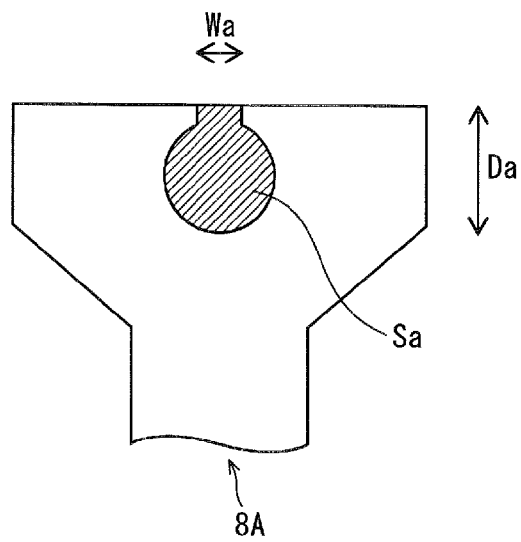
FIG. 17 is a view illustrating slit shapes.
Figure 17B:
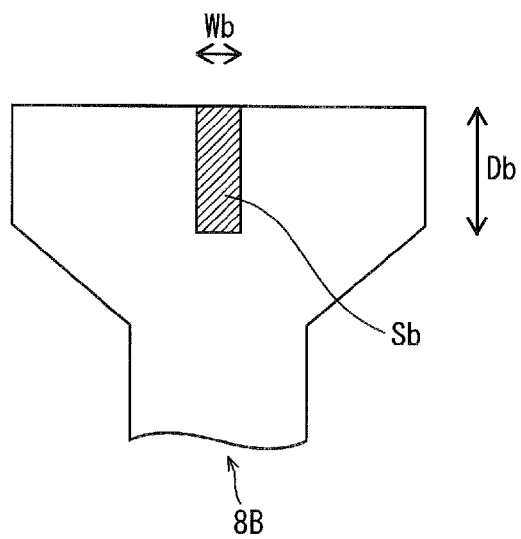
Figure 17C:
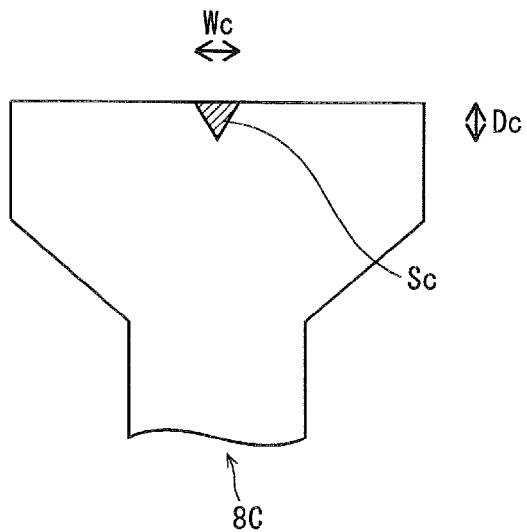

Note, in addition, that shape of a slit may be made to differ as shown in FIGS. 17A, 17B, and 17C between those stator teeth to which a sub-coil is accommodated and those stator teeth to which a sub-coil is not accommodated. FIG. 17A shows a stator tooth 8A around which a sub-coil is wound, whereas FIGS. 17B and 17C respectively show stator teeth 8B and 8C around which no sub-coils are wound.

The cross sectional area Sb of the stator tooth 8B and the cross sectional area Sc of the stator tooth 8C are each smaller than the cross sectional area Sa of the stator tooth 8A. Consequently, the stator teeth 8B and 8C are each larger in volume to the stator tooth 8A. Consequently, occurrence of magnetic saturation is reduced.

In addition, the slit opening Wb of the stator tooth 8b as well as the slit opening Wc of the stator tooth 8c each have the same width as the slit opening Wa of the stator tooth 8A. With the above structure, the stator teeth 8B and 8C are ensured to have the same saliency as the stator tooth 8A, so that the torque ripple is reduced.

Note that the depth Db of the stator tooth 8B is the same as the depth Da of the stator teeth 8A, whereas the depth Dc of the stator teeth 8C is smaller than the depth Da of the slit of the stator tooth 8A. The depth of each slit may be made small similarly to the stator tooth 8C as long as the depth falls within the range where the teeth are ensured to have the same saliency.

In the modifications shown in FIGS. 17A-17C, the stator teeth have the same in shape and differ only in the slit shape. Alternatively, however, the stator teeth may be made smaller in width or volume of the tip portion corresponding to the slit size reduction. As a result of such a modification, more space is provided for accommodating coils, which makes it possible to use a thicker wire to form a coil of lower resistance, or to increase the number of windings to form a coil, thereby to increase the torque produced from the same electric current.

INDUSTRIAL APPLICABILITY

The present invention may be used as a synchronous motor in compressors, electric cars, hybrid cars, fuel cell-powered cars, and the like, in which there is a desire for a small, efficient, low-vibration, and low-noise motor.

REFERENCE SIGNS LIST 1, 21 synchronous motor drive system
2 rotor
3 stator
4 rotor core
5 permanent magnet
6 magnetic pole
7 stator yoke
8 stator teeth
9 main coil
10 sub-coil
11, 12 inter-polar gap of rotor
52 rotor
53 stator
54 rotor core
55 permanent magnet
57 stator yoke
58 stator teeth
100 synchronous motor drive system
101 direct current source
102a, 102b, 102c, 102d inverter
103 control circuit

The invention claimed is:

1. A synchronous motor drive system comprising a synchronous motor and a drive device for driving the synchronous motor,
the synchronous motor including:
a rotor having a plurality of magnetic poles located circumferentially of the rotor at equally spaced intervals;
a stator having an annular stator yoke and a plurality of stator teeth located circumferentially on the stator yoke at equally spaced intervals, each stator tooth in one or more pairs of two adjacent stator teeth having a slit formed at a tip thereof;
a plurality of main coils each wound around a different one of the stator teeth in concentrated winding; and
one or more sub-coils each wound between a different pair of the one or more pairs through the slits, wherein
the drive device is configured to separately control electric current supplied to the main coils and electric current supplied to the sub-coils, and supplies electric current only to the main coils when a requested torque is less than a predetermined value and to both the main coils and the sub-coils when the requested torque is equal to or greater than the predetermined value.

2. The synchronous motor drive system according to claim 1, wherein
the drive device supplies sine-wave alternating current to the main coils and rectangular-wave alternating current to the sub-coils.

3. The synchronous motor drive system according to claim 1, wherein
each sub-coil is located at an electrical angle of $\pi$ radians with respect to one of the main coils,
a winding direction of each sub-coil is opposite to a winding direction of the one of the main coils that is located at an electrical angle of $\pi$ radians with respect to the sub-coil, and
the drive device supplies, to each sub-coil, electric current that is in phase with electric current supplied to the one of the main coils that is located at an electrical angle of $\pi$ radians with respect to the sub-coil.

4. The synchronous motor drive system according to claim 1, wherein
each sub-coil is located at an electrical angle of $\pi$ radians with respect to one of the main coils,
a winding direction of each sub-coil is the same as a winding direction of the one of the main coils that is located at an electrical angle of $\pi$ radians with respect to the sub-coil, and
the drive device supplies, to each sub-coil, electric current with a phase difference of $\pi$ radians from current supplied to the one of the main coils that is located at an electrical angle of $\pi$ radians with respect to the sub-coil.

5. The synchronous motor drive system according to claim 1, wherein
each sub-coil is located at an electrical angle of $\pi$ radians with respect to one of the main coils, and
the drive device supplies electric current with a first phase to a sub-coil and electric current with a second phase to a main coil that is located at an electrical angle of $\pi$ radians with respect to the sub-coil, a phase difference between the first phase and the second phase being other than zero or $\pi$ radians.

6. The synchronous motor drive system according to claim 5, wherein
the first phase is behind the second phase.

7. The synchronous motor drive system according to claim 5, wherein
the first phase is ahead of the second phase.

8. The synchronous motor drive system according to claim 1, wherein
each slit accommodates only one of the sub-coils, the one sub-coil being wound between the stator tooth having the slit and one of two stator teeth that are adjacent to the stator tooth having the slit.

9. The synchronous motor drive system according to claim 1, wherein
each of at least three adjacent stator teeth has a slit formed at a tip thereof, and
the slit of the middle one of the stator teeth accommodates two of the sub-coils, each of the two sub-coils being wound between the middle stator tooth and a different one of the two other stator teeth.

10. The synchronous motor drive system according to claim 8, wherein
each of the plurality of stator teeth has a slit formed at a tip thereof.

11. The synchronous motor drive system according to claim 1, wherein
each of the plurality of stator teeth has a slit formed at a tip thereof,
at least one of the slits accommodates one of the sub-coils, and at least one of the slits accommodates none of the sub-coils, and
any slit accommodating none of the sub-coils is smaller in cross-sectional area than any slit accommodating one of the sub-coils.

12. The synchronous motor drive system according to claim 11, wherein
an opening width of any slit accommodating none of the sub-coils is equal to an opening width of any slit accommodating one of the sub-coils.

13. The synchronous motor drive system according to claim 1, wherein
each of the main coils forms a set of three-phase coils with two other of the main coils, one of which is positioned $2\pi/3$ radians ahead of the main coil in electrical angle, and another of which is positioned $2\pi/3$ radians behind the main coil in electrical angle, and
each of the sub-coils forms a set of three-phase coils with two other of the sub-coils, one of which is positioned $2\pi/3$ radians ahead of, and another of which is positioned $2\pi/3$ radians behind the sub-coil in electrical angle.

14. The synchronous motor drive system according to claim 1, wherein
at least one of the stator teeth is in a skew arrangement by being circumferentially skewed progressively along an axial direction of the rotor by, at most, the interval between the stator teeth.

15. The synchronous motor drive system according to claim 1, wherein
the synchronous electric motor is an outer rotor synchronous electric motor.

16. The synchronous motor drive system according to claim 1, wherein
each of the plurality of magnetic poles is composed of a permanent magnet, and each permanent magnet is located in a core of the rotor.

17. The synchronous motor drive system according to claim 1, wherein
the synchronous motor is for automobiles.

18. The synchronous motor drive system according to claim 9, wherein
each of the plurality of stator teeth has a slit formed at a tip thereof.

19. A synchronous motor comprising:
a rotor having a plurality of magnetic poles located circumferentially of the rotor at equally spaced intervals;
a stator including an annular stator yoke and a plurality of stator teeth located circumferentially on the stator yoke at equally spaced intervals, each stator tooth having a slit formed at a tip thereof;
a plurality of main coils each wound around a different one of the stator teeth in concentrated winding; and
a plurality of sub-coils each wound between a different pair of two adjacent stator teeth through the slit, one or more of the stator teeth not provided with any of the sub-coils, wherein
any slit accommodating none of the sub-coils is smaller in cross-sectional area than any slit accommodating one of the sub-coils.

20. The synchronous motor according to claim 19,
an opening width of any slit accommodating none of the sub-coils is equal to an opening width of any slit accommodating one of the sub-coils.

\* \* \* \* \*